United States Patent

Mieglitz et al.

[11] Patent Number: 6,056,175
[45] Date of Patent: May 2, 2000

[54] MOBILE PHONE HOUSING FOR A VEHICLE

[75] Inventors: Hans-Helmut Mieglitz, Monheim; Alexander Schidan, Solingen; Charles Roughton, Straelen, all of Germany

[73] Assignee: Becker Group Europe GmbH, Germany

[21] Appl. No.: 09/291,253

[22] Filed: Apr. 13, 1999

[30] Foreign Application Priority Data

Apr. 18, 1998 [DE] Germany .............................. 198 17 302

[51] Int. Cl.[7] ........................................................ B60N 3/10
[52] U.S. Cl. ........................... 224/282; 224/483; 224/544; 224/553; 224/929; 379/446; 379/455; 248/311.2
[58] Field of Search .................................... 224/282, 539, 224/544, 483, 545, 553, 929, 926; 296/37.5, 37.8, 37.12; 379/441, 446, 455; 248/27.1, 311.2

[56] References Cited

U.S. PATENT DOCUMENTS

| | | | |
|---|---|---|---|
| 4,953,771 | 9/1990 | Fischer et al. | 224/926 X |
| 5,024,411 | 6/1991 | Elwell | 224/539 X |
| 5,494,249 | 2/1996 | Ozark et al. | 224/926 X |
| 5,556,017 | 9/1996 | Tro | 224/929 X |
| 5,618,018 | 4/1997 | Baniak | 224/483 X |
| 5,787,167 | 7/1998 | Anderson | 379/446 |
| 5,860,630 | 1/1999 | Wildey et al. | 224/926 X |

FOREIGN PATENT DOCUMENTS

| | | | |
|---|---|---|---|
| 4022193 A1 | 1/1992 | Germany | 224/926 |
| 405193405 | 8/1993 | Japan | 224/483 |

*Primary Examiner*—Gregory M. Vidovich
*Attorney, Agent, or Firm*—Harness, Dickey & Pierce, P.L.C.

[57] ABSTRACT

In accordance with the teachings of the present invention, an installation device for a vehicle is disclosed which in particular is for the releasable mounting of a handheld mobile phone. The installation device is designed with a housing (2) which is opened toward the front and is to be arranged on a receiving shaft of a vehicle part (1), such as an instrument panel, console, or the like, with a carrying part (16) which can be pivoted into, and out of, the housing (2) via a substantially vertically aligned axis of rotation (5), with a bearing plate (7) which is arranged on the carrying part (16) and is intended for the mobile phone (12) when the carrying part (16) has been pivoted out of the housing (2), and with a substantially horizontally aligned pivot axis (11) between the carrying part (16) and a bearing plate (7).

8 Claims, 5 Drawing Sheets

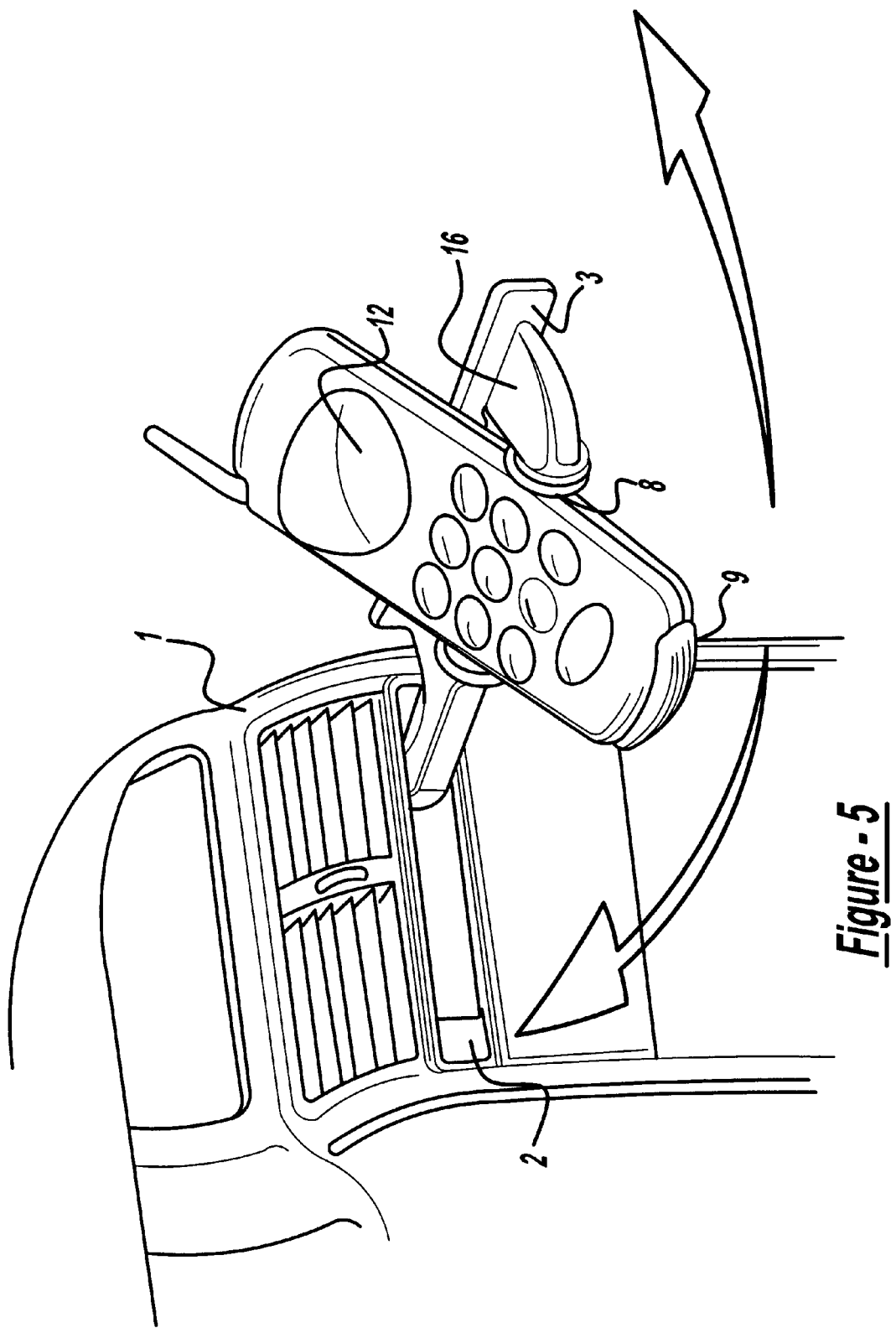

MOBILE PHONE HOUSING FOR A VEHICLE

BACKGROUND OF THE INVENTION

1. Technical Field

This invention generally relates to an installation device for a vehicle and, more particularly, to a releasable mounting for a handheld mobile phone.

2. Discussion

Various arrangements and installation devices have been previously used for securing a mobile phone within a motor vehicle. One such arrangement is disclosed by DE 195 39 784 C2. This reference in particular discloses the releasable mounting of a handheld phone and provides a receiving compartment which is guided in a longitudinally movable manner in a housing open toward the front and is intended for a handheld phone retained in a clamping manner by the receiving compartment. The receiving compartment comprises two compartment parts which are arranged one behind the other in the axial direction and are of different lengths, of which the longer compartment part serves for receiving the handheld phone in a suitable manner and can be drawn out of the housing to the full extent and is connected to the shorter compartment which remains permanently in the housing via a hinge and can be pivoted perpendicularly with respect to the slide direction.

SUMMARY OF THE INVENTION

In accordance with the teachings of the present invention, it is an object of the present invention to make available an installation device which is simplified in relation to, and of considerably smaller dimensions than, the above referenced apparatus and others in the field of use.

In accordance with the teachings of a preferred embodiment of the present invention, a device is provided which makes it possible to position a mobile phone in the use position in order to ensure quick access to the phone, to provide a well suited central storage area, to bring the mobile display and the key pad into a position in which they can be seen, to aid hands free talking by the proximity of the holder position, to avoid slipping of the mobile phone during travel, to make it more difficult for one to forget the mobile phone when one is leaving the vehicle, and generally to render telephoning from inside ones vehicle, if not entirely avoidable, then safer by the design of the surroundings and a reduction in the amount of holding on the part of the driver.

BRIEF DESCRIPTION OF THE DRAWINGS

The various advantages of the present invention will become apparent to one skilled in the art upon reading the following specification and by reference to the drawings in which:

FIG. 5 is a perspective view of the installation device of the present invention fitted with a mobile phone and shown in the in use position.

DETAILED DESCRIPTION OF THE PREFERRED EMBODIMENT

The following description of the preferred embodiment is merely exemplary in nature and is in no way intended to limit the invention, or its application, or uses.

Figure 1:
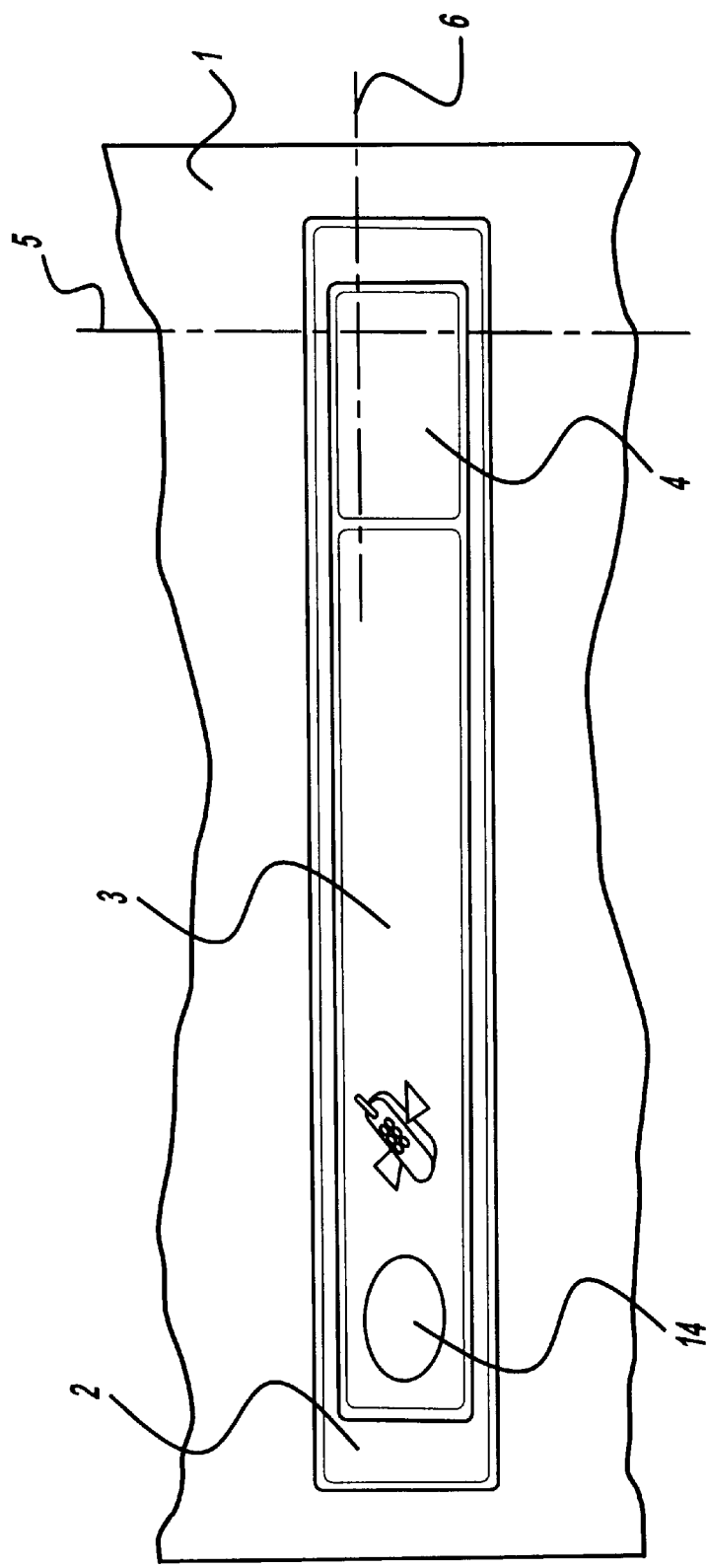
FIG. 1 is a front view of the installation device made in accordance with the present invention.

Referring to FIG. 1, there is shown a vehicle part 1, which may be a cockpit or center console neck or the like, with an installation unit arranged on a receiving shaft of said neck. Of the installation unit, it is possible to see the frame of a housing 2 and the front subdivided into two screens 3 and 4.

Figure 2:
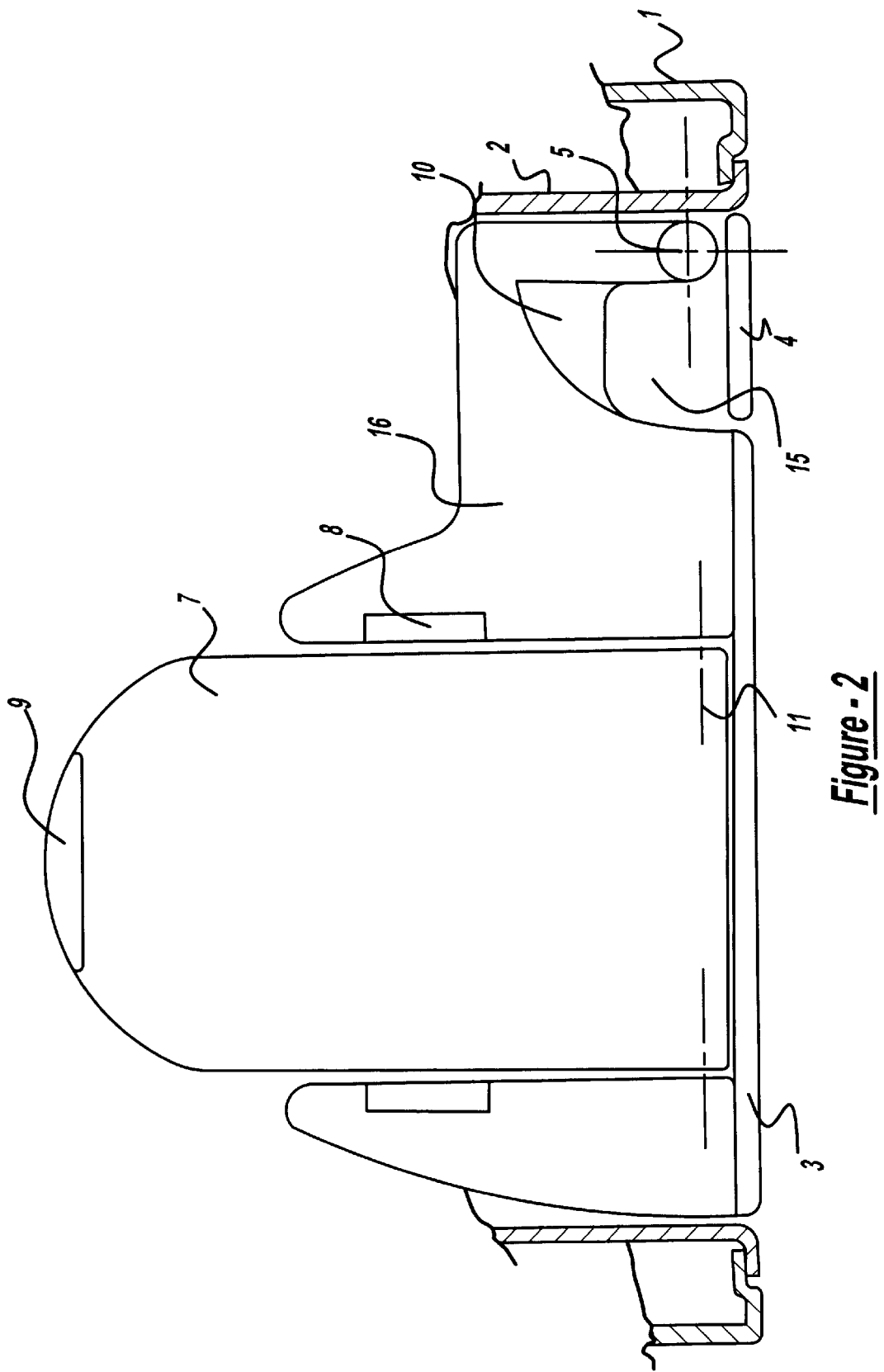
FIG. 2 is a plan view of the installation device in the not-in-use position.
Figure 3:
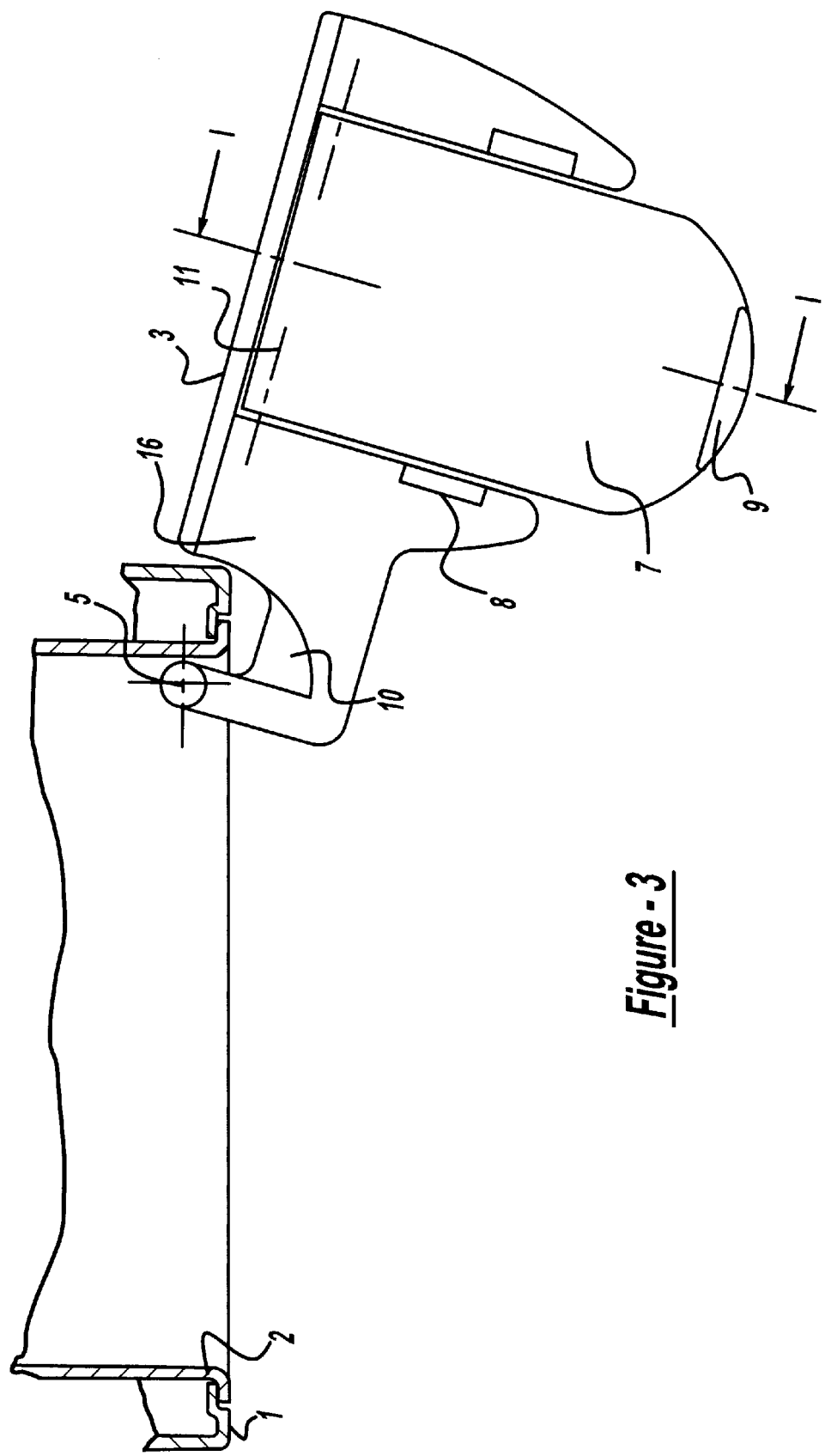
FIG. 3 is a plan view of the installation device in the use position.
Figure 4:
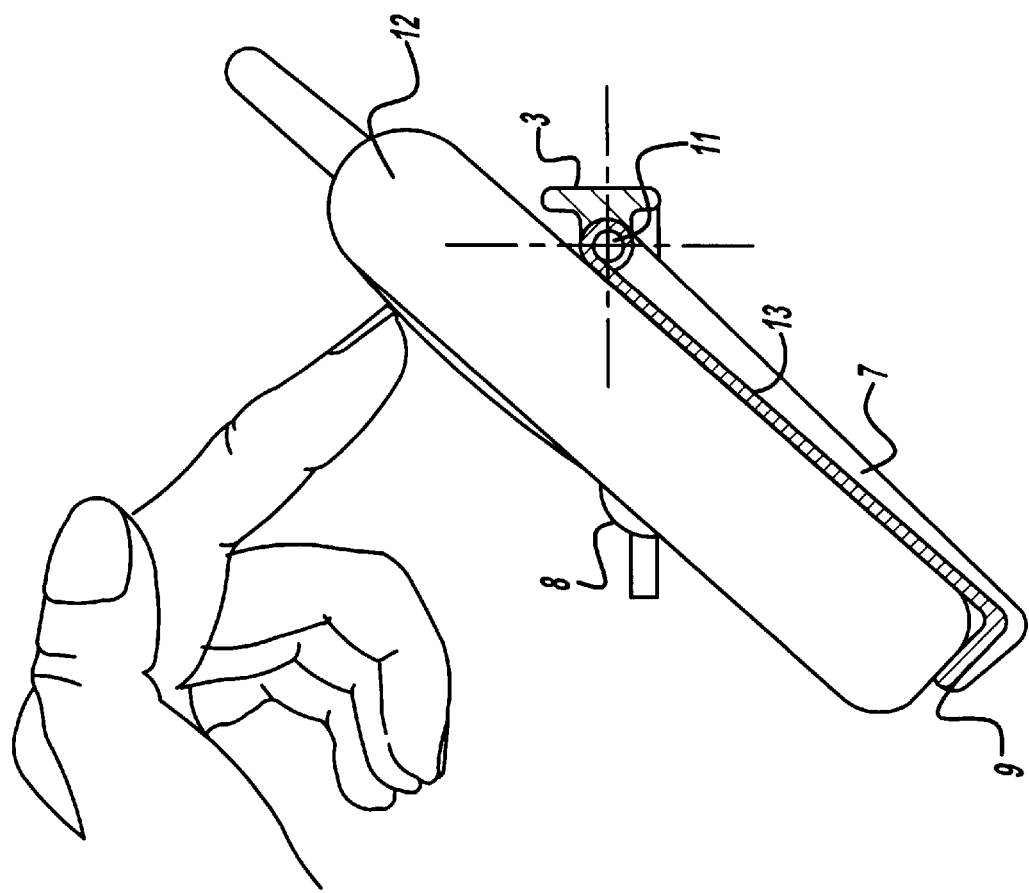
FIG. 4 is a sectional view generally taken along lines I—I in FIG. 3.

The installation device comprises the housing 2 and a carrying part 16 which can be pivoted into the housing 2 (shown in FIGS. 1 and 2), and pivoted out of the housing 2 (shown in FIGS. 3–5), via a substantially vertically aligned axis of rotation 5. Arranged on the carrying part 16 is a bearing plate 7 on which a mobile phone 12 can be deposited when the bearing plate 7 is located in the position in which it has been pivoted out of the housing 2. The bearing plate 7 is articulated on the carrying part 16 by a substantially horizontally aligned pivot axis 11. The pivoted-down, oblique position of the bearing plate 7 is shown in FIGS. 4 and 5 and is approximately 45 degrees from horizontal, which has proven to be optimum for the positioning of the mobile phone 12. The oblique position is brought about by the mobile phone 12 being placed in such a position or being placed in the position by its own weight. The force of a restoring spring 13 tries to transfer the bearing plate 7 into a horizontal position thereby allowing the carrying part 16 to be guided back into the housing 2.

Located at the free end of the bearing plate, which is considerably shorter than the length of most commercially available mobile phones 12, is a stop 9 for supporting the mobile phone 12. For supporting the mobile phone 12 laterally, use is made of buffers 8 which are arranged on the carrying part 16 to the left and right lateral portions along side the bearing plate 7.

The previously mentioned screens 3 and 4 are used for closing off the housing opening in the not-in-use position of the installation device. In the present embodiment, the screen 3 is connected rigidly to the carrying part 16. For example, the carrying part 16 and the screen 3 can be formed as an integral plastic injection molded piece. The screen 4, in contrast, is a separate component, which is connected to the housing 2 via an axis of rotation 6. The axis of rotation 6 is adjacent to the top border region of the screen 4, with the result that, on account of its own weight, the screen tries to assume its covering position. For the purposes of opening the screen 4, use is made of a run-on slope 10 which is arranged on the carrying part 16 and, when the carrying part 16 is pivoted open, moves through the free space 15 and then against the rear side of the screen 4.

The axis of rotation 5 is positioned in a front corner region of the housing 2, with the result that there is a relatively large pivoting region for the carrying part 16. The pivot axis 11 is arranged on the carrying part 16, adjacent to the screen 3.

In order to increase the ease of operation of the present invention, the installation device may be provided with an automatic opening mechanism known within the art. Tipmatic or push-push mechanisms are just two of the means currently known in the art. A push-point indicator, designated by 14 in FIG. 1, is used in conjunction with such a mechanism.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

What is claimed is:

1. An installation device for the releasable mounting of a handheld mobile phone in a vehicle, said installation device comprising:

a housing having an open end engagable in a receiving shaft of the vehicle;

a carrying part pivotally attached to the housing such that the carrying part is pivotal into, and out of, the housing about a substantially vertically aligned axis of rotation; and a bearing plate adapted to support the mobile phone when the carrying part has been pivoted out of the housing, said bearing plate being pivotally attached to the carrying part about a substantially horizontally aligned pivot axis.

2. The installation device as claimed in claim 1 wherein the substantially vertically aligned axis of rotation is located in a front corner region of the housing.

3. The installation device as claimed in claim 1 wherein the bearing plate is movable into an oblique position counter to the force of a restoring spring.

4. The installation device as claimed in claim 1 wherein the length of the bearing plate is less than the length of the mobile phone.

5. The installation device as claimed in claim 1 wherein the bearing plate has a stop at its free end for supporting the mobile phone.

6. The installation device as claimed in claim 1 further comprising buffers laterally arranged on the carrying part to support the mobile phone.

7. The installation device as claimed in claim 1 wherein, when the carrying part has been pivoted into the housing, the housing opening is closed off by a first screen, which is formed rigidly with the carrying part, and by a second screen, which is articulated on the housing in the region of the vertical axis of rotation about a substantially horizontally aligned axis of rotation.

8. The installation device as claimed in claim 7, further comprising a run-on slope arranged on the carrying part engagable with the second screen to pivot the second screen into an open position.

* * * * *